United States Patent
Furutani (10) Patent No.: US 7,850,439 B2
(45) Date of Patent: Dec. 14, 2010

(54) VENT PLUG FOR A TIRE VULCANIZATION MOLD, TIRE VULCANIZATION MOLD AND METHOD FOR MANUFACTURING A PNEUMATIC TIRE USING THE TIRE VULCANIZATION MOLD

(75) Inventor: Hiroyuki Furutani, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 132 days.

(21) Appl. No.: 12/397,398

(22) Filed: Mar. 4, 2009

(65) Prior Publication Data

US 2009/0261509 A1    Oct. 22, 2009

(30) Foreign Application Priority Data

Apr. 21, 2008   (JP)   ............... 2008-110478

(51) Int. Cl.
  *B29C 33/10*   (2006.01)
  *B29D 30/06*   (2006.01)
(52) U.S. Cl. .................... 425/28.1; 264/326
(58) Field of Classification Search ........... 264/326; 425/28.1
  See application file for complete search history.

(56) References Cited

U.S. PATENT DOCUMENTS 5,059,380 A * 10/1991 Wise et al. .................. 264/326
5,922,237 A *  7/1999 Green ........................ 249/141
5,939,101 A *  8/1999 Green ........................ 425/28.1
6,206,336 B1 * 3/2001 Espie et al. ................. 249/141

FOREIGN PATENT DOCUMENTS

| | | |
|---|---|---|
| JP | 10-146840 | 6/1998 |
| JP | 10-296735 | 11/1998 |
| JP | 2005-028589 | 2/2005 |
| WO | WO 2007/100308 A2 * | 9/2007 |

* cited by examiner

*Primary Examiner*—Kat Wyrozebski
*Assistant Examiner*—Robert J Grun
(74) *Attorney, Agent, or Firm*—Fish & Richardson P.C.

(57) ABSTRACT

The invention relates to a vent plug for a tire vulcanization mold used for a vent hole of the mold, the tire vulcanization mold, and a manufacturing method for the tire using the mold. The vent plug includes a plug holder with a hollow ventilation portion and a plug head within the ventilation portion. The plug holder includes a tapered seat portion, an inside diameter of which becomes smaller toward a mold rear side, and a cylinder portion located at the mold rear side of the seat portion. The plug head includes a tapered head portion, an outer diameter of which becomes smaller toward the mold rear side, a base body portion located at the mold rear side of the head portion, and a slit portion communicating with the ventilation portion from an upper end face of the plug head.

5 Claims, 4 Drawing Sheets

VENT PLUG FOR A TIRE VULCANIZATION MOLD, TIRE VULCANIZATION MOLD AND METHOD FOR MANUFACTURING A PNEUMATIC TIRE USING THE TIRE VULCANIZATION MOLD

BACKGROUND OF THE INVENTION

1. Field of the Invention

The present invention relates to a vent plug for a tire vulcanization mold mounted in a vent hole of the tire vulcanization mold, a tire vulcanization mold and a method for manufacturing a pneumatic tire by using the tire vulcanization mold.

2. Description of the Related Art

Conventionally, air is trapped between an inner surface of a tire vulcanization mold and an unvulcanized tire during vulcanization molding. In order to ventilate the air out of the mold, a tire vulcanization mold used in a vulcanization process of a tire is formed with many narrow exhaust holes called a vent hole. When a tire is subjected to vulcanization molding process, an unvulcanized tire is heated within a mold heated to a high temperature. During this process, the unvulcanized tire is expanded and a viscosity of a rubber surface decreases. Therefore, rubber flows into the vent holes during vulcanization molding of the tire and projections, so-called spews, which extend like a beard on a tire surface, are formed. Therefore, after completing the vulcanization molding process of the tire, a trimming process to remove the spews is indispensable in post processing. Accordingly, there is such a problem that works efficiency and productivity is reduced.

To solve this problem, in order to improve the work efficiency and the productivity by eliminating the trimming process after the vulcanization molding process of the tire, there have been proposed the following tire vulcanization molds, in which a vent hole is arranged to close while releasing the air to thereby prevent rubber from flowing into the vent hole.

Japanese Unexamined Patent Publication No. 10-296735 discloses a vent hole open/close valve for a mold, which includes a vent base having a vent hole formed therein, an open/close valve body movable with respect to the vent base on opening/closing the vent hole, a spring unit formed integrally with the vent base to open the vent hole, and a valve seat formed between the vent base and the open/close valve body. The above vent hole open/close valve is arranged to be closed by rubber within the mold when the rubber comes into contact with an upper end face of the open/close valve body and pushes the same. This arrangement prevents the rubber from flowing into the vent hole after the air is ventilated out of the mold. As a result, spews are prevented from being generated on the surface of the tire manufactured using the mold; and thus, the trimming process after the vulcanization molding of the tire is eliminated.

However, the above vent hole open/close valve has the following problems. That is, the spring unit needs to be formed integrally with the vent base and a complicated open/close mechanism is provided thereto. Therefore, a price of the valve is considerably high and the valve is difficult to manufacture. Further, the valve is used in the open/close valve body combined with a spring unit fitted thereto. Therefore, the spring unit may often drop off from the open/close valve body; and thus the valve is poor in durability.

Japanese Unexamined Patent Publication No. 10-146840 discloses a vent hole open/close valve for a mold, which includes an open/close valve body and a spring unit attached integrally to the open/close valve body to open the open/close valve body. The vent hole open/close valve is arranged so that the open/close valve body opens/closes the vent hole by using or against a spring force of the spring unit to prevent the rubber from flowing into the vent hole after releasing the air out of the mold. As a result, spews are prevented from being generated on the tire surface manufactured by using the mold; and thus the trimming process after the tire molding process can be eliminated.

However, in the above vent hole open/close valve, the open/close valve body is repeatedly opened/closed by the spring unit. Due to a load applied to the spring unit, the durability of the spring unit decreases as time passes.

Japanese Unexamined Patent Publication No. 2005-28589 discloses such a plug used for a vent hole of a tire vulcanization mold that a plug body includes a cylinder portion fitted to vent cylinder of a vent hole and a head portion that comes into contact with a recess portion having a step. The cylinder portion is formed with a communication path communicated with the vent cylinder, and the head portion is provided with an open/close valve for allowing the communication path and the inside of the mold to be communicated with each other or to be closed therebetween. In the plug described above, the open/close valve has a function as a valve to open the vent hole before placing a tire into the mold; and after the tire is placed, to close the vent hole utilizing a pressure given by the tire.

However, in the above plug, due to a structure thereof, the open/close valve cannot completely close the vent hole utilizing the pressure given by the tire. Rubber may flow into the vent hole through the communication path. This problem noticeably appears when the plug is repeatedly used. As a result, spews are generated on the surface of the tire manufactured using the mold for forming the tire provided with the above-described plug; and thus, the trimming process is required after molding the tire. Further, when the plug is made of a heat-resistant resin, in particular when the plug is repeatedly used, the plug tends to deteriorate quickly resulting in a reduction of the durability of the plug.

SUMMARY OF THE INVENTION

The present invention has been made under the above circumstances. An object of the present invention is to provide a vent plug for a tire vulcanization mold used for a vent hole of the tire vulcanization mold with which a tire can be molded while preventing spews from being generated on the tire surface during vulcanization molding of the tire, the tire vulcanization mold, and a manufacturing method for the tire using the tire vulcanization mold; thereby work efficiency and productivity in post processing after a vulcanization molding process of the tire is improved as well as an appearance of the tire is improved.

The above-mentioned object can be achieved by the present invention as follows. That is, the present invention provides a vent plug for a tire vulcanization mold mounted in a vent hole of the tire vulcanization mold, the vent plug comprising: a plug holder having a hollow ventilation portion; and a plug head fitted within the ventilation portion, wherein the plug holder includes a tapered seat portion, an inside diameter of which becomes smaller toward a mold rear side, and a cylinder portion located at the mold rear side of the seat portion, the plug head includes a tapered head portion, an outer diameter of which becomes smaller toward the mold rear side, a base body portion located at the mold rear side of the head portion, and a slit portion communicated with the ventilation portion from an upper end face of the plug head, when defining an inside diameter at an upper end face of the plug holder as D1, and an outer diameter at an upper end face of the plug head when the slit portion is opened as D2, D1<D2 is satisfied, and when defining a taper angle of the seat portion as α1, and a taper angle of the head portion as α2, α1<α2 is satisfied.

According to the vent plug for the tire vulcanization mold of the present invention, the outer diameter D2 at the upper end face of the plug head when the slit portion is opened is larger than the inside diameter D1 of the plug holder at the upper end face. Therefore, when an unvulcanized tire is placed in the vulcanization mold before being pressed to the vulcanization mold using a bladder or the like, the upper end face of the plug head is held in a state that the upper end face is higher than the upper end face of the plug holder. In this state, the slit portion formed in the head portion of the plug head is communicated with the ventilation portion through the upper end face of the plug head. With this, a path for releasing the air to the mold rear side from the inside of the tire vulcanization mold through the slit portion is formed. Thus, the air trapped between the inner face of the mold and the unvulcanized tire during vulcanization molding can be ventilated out of the mold.

When the unvulcanized tire is placed in the vulcanization mold and pressed onto the vulcanization mold by a bladder or the like, the plug head is pressed toward the mold rear side while the unvulcanized tire is in contact with the upper end face of the plug head. In the vent plug for the tire vulcanization mold according to the present invention, when the plug head is pressed toward the mold rear side, the plug head is pushed toward the mold rear side while the slit portion is closed at the upper end face of the plug head, and the head portion of the plug head is seated on the seat portion. As a result, the upper end face of the plug head closes the path from the inside of the tire vulcanization mold to the mold rear side. Thus, the rubber is prevented from flowing into the vent hole and spew is prevented from being generated.

When the vulcanized tire is taken out after completing the vulcanization process of the tire, press force is no longer given to the plug head toward the mold rear side. Then, an elastic force of the plug head itself exerts a force to the pressed plug head in a direction that the plug head is pushed up to the inside of the mold. Here, in the vent plug for the tire vulcanization mold of the present invention, a taper angle α1 of the seat portion and a taper angle α2 of the head portion are set to be α1<α2. Therefore, in a state that the plug head is pressed toward the mold rear side, a seat surface of the seat portion and a side face of the head portion are easily brought into line contact and a friction resistance between the seat portion and the head portion is reduced. Accordingly, the plug head is pushed into the mold up to an original position by the elastic force of the plug head itself. Consequently, the slit portion is opened at the upper end face of the plug head and held to be higher than the upper end face of the plug holder. Accordingly, the plug head can be repeatedly used for vulcanization molding without particularly requiring a resetting operation.

As described above, the vent plug for the tire vulcanization mold according to the present invention has a simple structure. Therefore, the manufacturing process thereof is simple and is manufactured with a low cost. Compared to a conventional vent plug for the tire vulcanization mold provided with an open/close mechanism, which utilizes an elastic force of a spring unit or heat resistant resin, the vent plug of the present invention is superior in durability.

In the above arrangement, it is preferred that the seat portion has a conical seat surface, the head portion has a frustum shape, and the slit portion is formed in a radial direction from a central axis of the head portion and the base body portion. With this arrangement, when the plug head is pressed toward the mold rear side or pushed up, the plug head is not interfered with anything. Therefore, the slit portion easily opens/closes at the end face of the plug head upper face. Further, when the plug head is pressed toward the mold rear side, a force is uniformly applied to the slit portion. Therefore, the slit portion can be easily closed without any gap, and thus an excellent effect of the present invention can be obtained.

In the above arrangement, it is preferred that when defining a linear expansion coefficient of a material constituting the plug holder as K1, and defining a linear expansion coefficient of a material constituting the plug head as K2, K1<K2 is satisfied. With this arrangement, when the plug holder and the plug head are cooled and contracted after completing the vulcanization process, a difference of the linear expansion coefficient between the plug holder and the plug head becomes larger due to a difference of a linear expansion coefficient thereof. A gap is easily formed between the seat surface of the seat portion and the side face of the head portion. As a result, the plug head can easily return to the original position after completing the vulcanization process.

The present invention provides a tire vulcanization mold having a vent hole, wherein the vent hole is formed with a vent plug for the tire vulcanization mold comprising a plug holder having a hollow ventilation portion and a plug head fitted within the ventilation portion, the plug holder includes a tapered seat portion, an inside diameter of which becomes smaller toward a mold rear side, and a cylinder portion located at the mold rear side of the seat portion, the plug head includes a tapered head portion, an outer diameter of which becomes smaller toward the mold rear side, a base body portion located at the mold rear side of the head portion, and a slit portion communicated with the ventilation portion from an upper end face of the plug head, when defining an inside diameter at an upper end face of the plug holder as D1, an outer diameter at an upper end face of the plug head when the slit portion is opened as D2, D1<D2 is satisfied, and when defining a taper angle of the seat portion as α1, and a taper angle of the head portion as α2, α1<α2 is satisfied.

With the above arrangement, when an unvulcanized tire is placed in the vulcanization mold and is pressed to the vulcanization mold by a bladder or the like, the air trapped between the inside of the mold and the unvulcanized tire is ventilated out of the mold through the slit portion. As the air is ventilated out of the mold, the unvulcanized tire presses the plug head toward the mold rear side and closes the path (slit portion) from inside of the tire vulcanization mold to the mold rear side. With this arrangement, rubber is prevented from flowing into the vent hole, and thus spew is prevented from being generated. As a result, by using the tire vulcanization mold of the present invention, the work efficiency and the productivity in post processing after the vulcanization process of the tire is improved, and the appearance of the tire can be improved. Further, the tire vulcanization mold can be repeatedly used for vulcanization molding without requiring the resetting operation of the vent plug portion. Thus, compared to the conventional tire vulcanization mold having an open/close mechanism utilizing an elastic force of a spring unit or heat resistance resin, the tire vulcanization mold according to the present invention is superior in durability.

The method for manufacturing a pneumatic tire according to the present invention includes the step of vulcanization using the above-described tire vulcanization mold. With this arrangement, spew is prevented from being generated in a vulcanization process of a pneumatic tire. As a result, according to the manufacturing method for the pneumatic tire of the present invention, the work efficiency and the productivity in post processing after the vulcanization process of the tire can be improved, and the appearance of the tire can be improved.

DETAILED DESCRIPTION OF THE PREFERRED EMBODIMENTS

Figure 1:
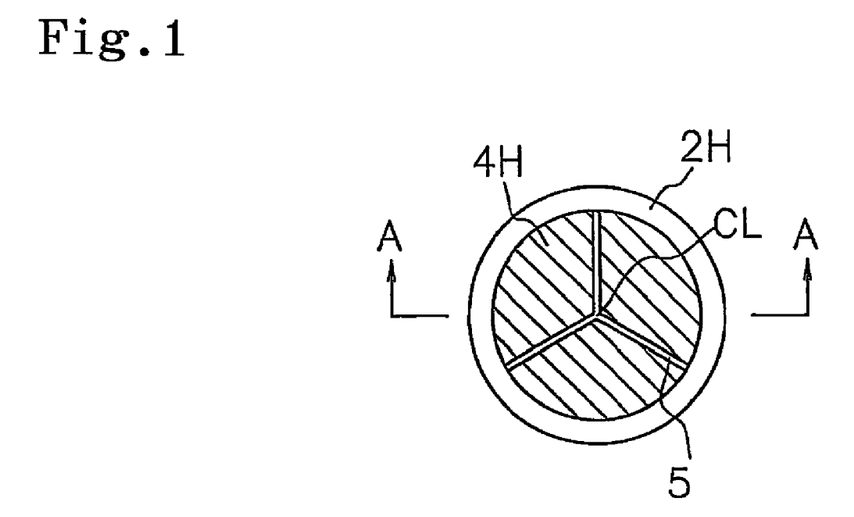
FIG. 1 is a front view of a vent plug for a tire vulcanization mold according to an embodiment of the present invention as viewed from an inside thereof.
Figure 2:
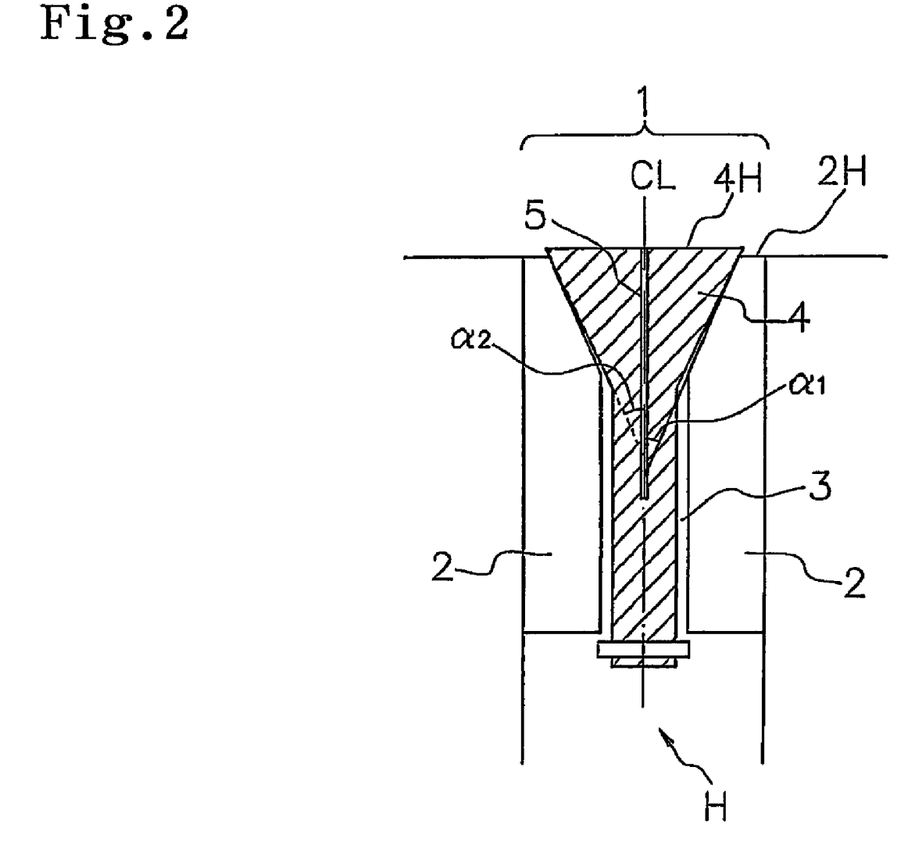
FIG. 2 is a sectional view of the vent plug shown in FIG. 1 as viewed in a direction of arrows A-A before beginning the vulcanization operation.
Figure 3:
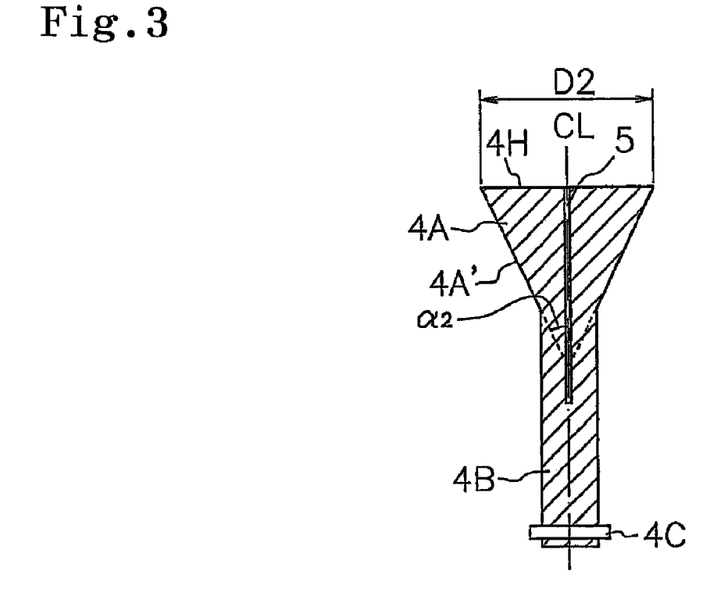
FIG. 3 is an enlarged view of FIG. 2 illustrating only the plug head 4.
Figure 4:
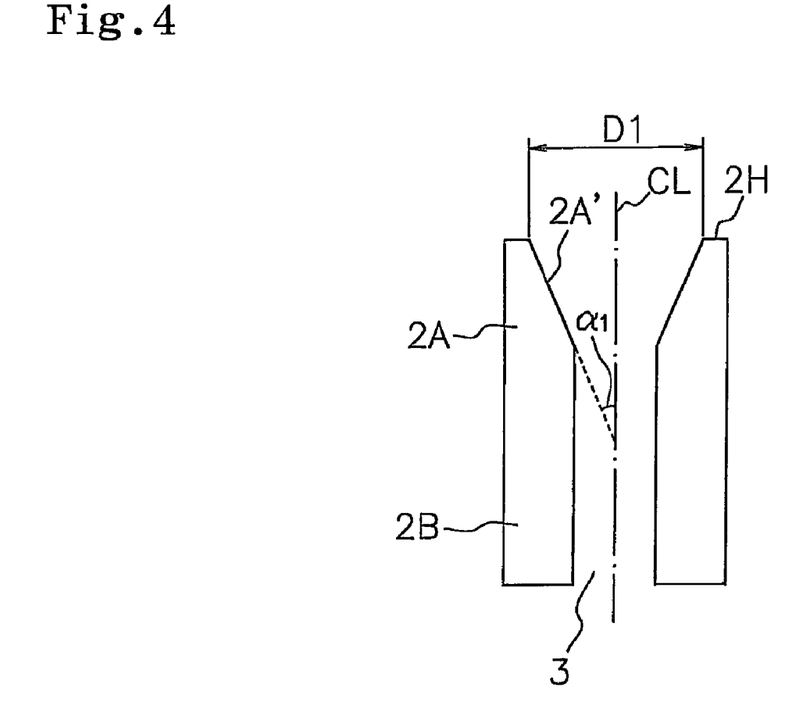
FIG. 4 is an enlarged view of FIG. 2 illustrating only the plug holder 2.

Embodiments of the present invention will be described below with reference to the drawings. FIG. 1 is a front view of a vent plug for a tire vulcanization mold according to an embodiment of the present invention as viewed from an inside thereof. FIG. 2 is a sectional view of the vent plug shown in FIG. 1 as viewed in a direction of arrows A-A before beginning the vulcanization operation. As shown in FIG. 1 and FIG. 2, a vent plug 1 for the tire vulcanization mold according to the present embodiment is mounted in a vent hole H of a tire vulcanization mold. The vent plug 1 includes a plug holder 2 including a hollow ventilation portion 3 and a plug head 4 that is fitted within the ventilation portion 3. FIG. 3 is an enlarged view of FIG. 2 illustrating only the plug head 4. FIG. 4 is an enlarged view of FIG. 2 illustrating only the plug holder 2.

In the present embodiment, the plug holder 2 includes a seat portion 2A having a tapered shape such that an inside diameter decreases toward a mold rear side (lower side in FIGS. 2 and 4), and a cylinder portion 2B, which is located at the mold rear side of the seat portion 2A as shown in FIG. 1, FIG. 2 and FIG. 4. A central axis CL of the cylinder portion 2B is formed to be coaxial with the tapered seat portion 2A and the central axis CL of the plug head 4 which will be described later. Since a seat surface 2A' is arranged to have an inclination of $\alpha 1$ with respect to the central axis CL, a taper angle of the seat portion 2A is set to $\alpha 1$ as shown in FIG. 4. In the present embodiment, the cylinder portion 2B has a cylindrical shape. Note that a range of the taper angle $\alpha 1$ is preferably set to 20 to 60 degrees in view of designing thereof.

As a material forming the plug holder 2, stainless used for an ordinary vent piece, which preferably has a linear expansion coefficient smaller than that of a material constituting the plug head 4, is exemplified.

The plug head 4 includes a head portion 4A having a tapered shape, an outer diameter of which becomes smaller toward the mold rear side (lower side in FIGS. 2 and 3), a base body portion 4B located at the mold rear side of the head portion 4A, and a slit portion 5 communicated with a ventilation portion 3 from an upper end face 4H of the plug head 4 as shown in FIGS. 1 to 3. Each slit portion 5 is formed so as to evenly divide the head portion each extending in a radial direction from the central axis CL of the head portion 4A and the base body portion 4B. Each slit portion 5 is communicated with the ventilation portion 3 from the upper end face 4H of the plug head 4. In the present embodiment, a plurality of, in particular, three slit portions are formed extending in a radial direction from the central axis CL of the head portion 4A so as to uniformly divide the head portion. The base body portion 4B has a cylinder solid shape. Further, the slit portion 5 is communicated with a ventilation portion 3 from the upper end face 4H of the plug head 4 via the base body portion 4B. By forming the plurality of slit portions, or by being communicated with the ventilation portion 3 via the base body portion 4B, air trapped between the inside of the mold and an unvulcanized tire can be easily ventilated out of the mold through the slit portion 5.

Since a side face 4A' of the head portion 4A is arranged so as to have an inclination of $\alpha 2$ with respect to the central axis CL as shown in FIG. 3, the taper angle of the head portion 4A is set to $\alpha 2$. In order to prevent rubber from flowing into the vent hole H while ensuring a path for releasing the air, a width of the slit portion 5 is preferably set to 0.02 to 0.5 mm, more preferably to 0.02 to 0.1 mm.

In the present embodiment, the plug head 4 is provided with a stopper 4C that is fastened to a front end of the base body portion 4B at the mold rear side thereof for substantially preventing the plug head 4 from moving in a direction of the central axis CL. Such stopper 4C maybe formed of, for example, a ring member; or may be simply clamped.

In the present embodiment, when the slit portion 5 is opened, the outer diameter D2 at the upper end face 4H of the plug head 4 is larger than the inside diameter D1 at the upper end face 2H of the plug holder 2 as shown in FIGS. 2 to 4. Therefore, when the unvulcanized tire is placed in the vulcanization mold and before being pressed to the vulcanization mold using a bladder or the like, the upper end face 4H of the plug head 4 is held to be higher than the upper end face 2H of the plug holder 2. In this state, the slit portion 5 formed in the head portion 4A of the plug head 4 is communicated with the ventilation portion 3 through the upper end face 4H of the plug head 4. With this, a path for releasing the air to the mold rear side from the inside of the tire vulcanization mold through the slit portion 5 is formed. Thus, the air trapped between the inner face of the mold and the unvulcanized tire during vulcanization molding can be ventilated out of the mold.

Figure 5:
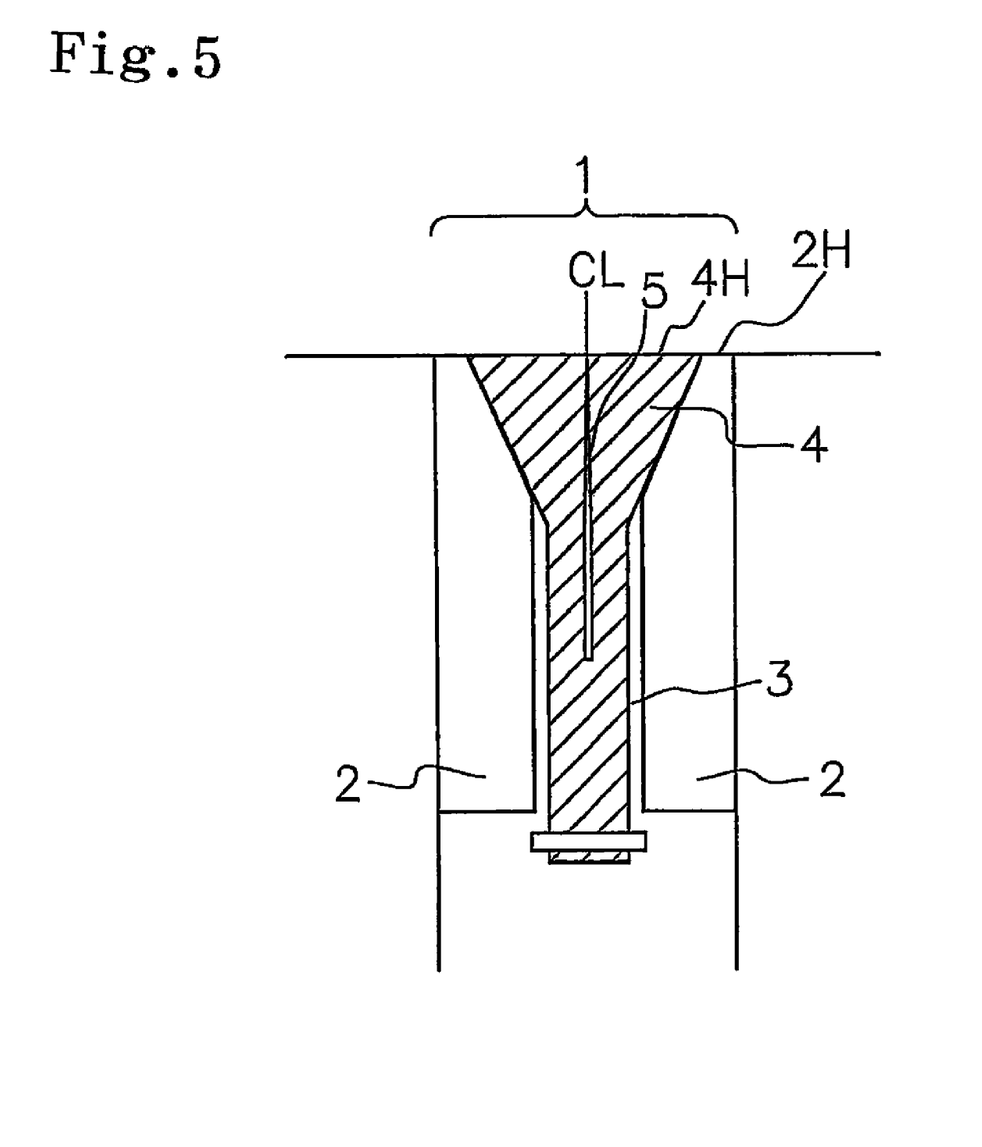
FIG. 5 is a sectional view of the vent plug shown in FIG. 1 as viewed in a direction of arrows A-A while the vulcanization operation is operated.

When the unvulcanized tire is placed in the vulcanization mold and pressed onto the vulcanization mold by a bladder or the like, the plug head 4 is pressed toward the mold rear side while the unvulcanized tire is in contact with the upper end face 4H of the plug head 4. When the plug head 4 is pressed toward the mold rear side, the plug head 4 is pushed toward the mold rear side while the slit portion 5 is closed at the upper end face 4H of the plug head 4, and the head portion 4A of the plug head 4 is seated on the seat portion 2A. As a result, the path from the inside of the tire vulcanization mold to the mold rear side is closed at the upper end face 4H of the plug head 4 as shown in FIG. 5. Thus, the rubber is prevented from flowing into the vent hole H and spew can be prevented from being generated.

When the vulcanized tire is taken out after completing the vulcanization process of the tire, press force is no longer given to the plug head 4 toward the mold rear side. Then, an elastic force of the plug head 4 itself exerts a force to the pressed plug head 4 in a direction that the plug head 4 is pushed up to the inside of the mold. Here, in the vent plug 1 for the tire vulcanization mold of the present invention, the taper angle $\alpha 1$ of the seat portion 2A and the taper angle $\alpha 2$ of the head portion 4A are set to be $\alpha 1 < \alpha 2$. Therefore, in the present embodiment, in a state that the plug head 4 is pressed in the mold rear side, the seat surface 2A' of the seat portion 2A and the side face 4A' of the head portion 4A are in line contact. With this arrangement, a friction resistance between the seat portion 2A and the head portion 4A is smaller than that in a case of face contact. Accordingly, the plug head 4 is pushed into the mold up to an original position by the elastic force of the plug head 4 itself. Consequently, the slit portion 5 is opened at the upper end face 4H of the plug head 4 and held in a state that the upper end face 4H of the plug head 4 is higher than the upper end face 2H of the plug holder 2 (FIG. 2). As a result, the plug head 4 can be repeatedly used for vulcanization molding without particularly requiring resetting operation and the like. In order to effectively reduce the friction resistance between the seat portion 2A and the head portion 4A, $\alpha 2 - \alpha 1$ is preferably 0.25 degrees or more, more preferably 2 degrees or more. In order to facilitate the slit portion 5 to be pushed toward the mold rear side while being closed, $\alpha 2 - \alpha 1$ is preferably 20 degrees or less.

When defining the linear expansion coefficient of the material constituting the plug holder 2 as K1; and the linear expansion coefficient of the material constituting the plug head 4 as K2, the relationship therebetween is K1<K2. With this arrangement, after completing the vulcanization process, when the plug holder 2 and the plug head 4 are cooled and contracted, a dimensional difference between the plug holder 2 and the plug head 4 becomes larger due to the difference in the linear expansion coefficient thereof. A gap is easily made between the seat surface of the seat portion 2A and the side face of the head portion 4A. As a result, after completing the vulcanization process, the plug head 4 can easily return to the original state thereof. As the material constituting the plug head 4, stainless, aluminum or copper is available. When the plug holder 2 is made of stainless and the plug head 4 is made of aluminum or copper, the above effect is preferably obtained.

In the tire vulcanization mold according to the present invention mounted with the vent plug 1 therefor in the vent hole H, a unvulcanized tire is placed in the vulcanization mold and is pressed to the vulcanization mold by a bladder or the like, in order to ventilate air trapped between the inside of the mold and the unvulcanized tire out of the mold through the slit portion 5. Moreover, as the air is ventilated out of the mold, the unvulcanized tire presses the plug head 4 toward the mold rear side and closes the path (slit portion 5) from inside of the tire vulcanization mold to the mold rear side. With this arrangement, rubber is prevented from flowing into the vent hole H, and thus spew is prevented from being generated. As a result, by using the tire vulcanization mold of the present invention, work efficiency and productivity in post processing after the tire vulcanization process is improved, and an appearance of the tire can be improved. Further, the tire vulcanization mold can be repeatedly used for vulcanization molding without requiring a resetting operation of the vent plug 1 portion. Thus, compared to a conventional tire vulcanization mold having an open/close mechanism utilizing an elastic force of a spring unit or heat resistance resin, the tire vulcanization mold according to the present invention is superior in durability.

According to a tire manufacturing method including the vulcanizing step using the above-described tire vulcanization mold, spew can be prevented from being generated in the vulcanization process of a pneumatic tire. As a result, according to the manufacturing method for the pneumatic tire of the present invention, work efficiency and productivity in post processing after the tire vulcanization process is improved, and the appearance of the tire is improved. In this manufacturing method, any steps, which are carried out in a conventional manufacturing method for the pneumatic tire, are included except that the tire vulcanization mold according to the present invention is used.

Another Embodiment

Another embodiment of the present invention will be described below.

Figure 6:
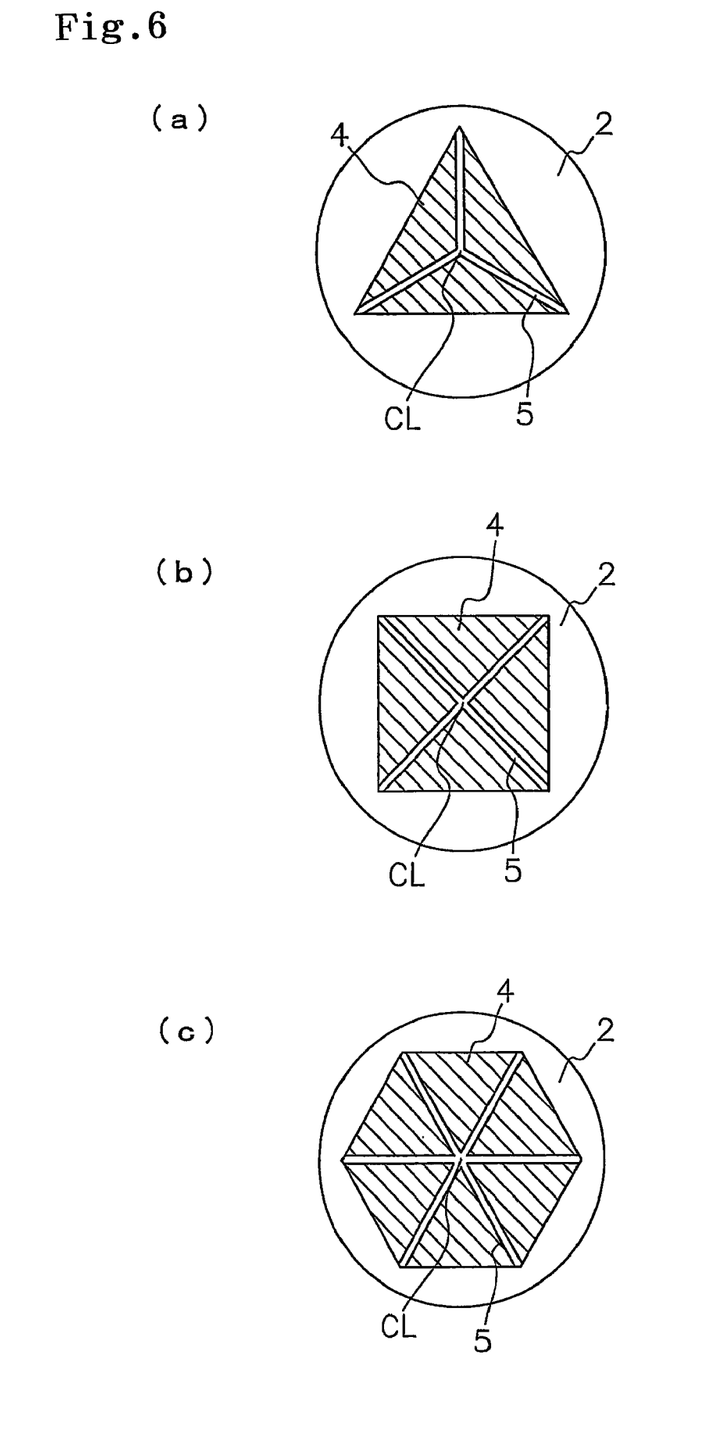
FIG. 6 is a sectional shape of the plug holder 2 and the plug head 4 as viewed in a direction of the central axis CL.

In the above-described embodiment, sectional shapes of the inside diameter at the seat portion 2A of the plug holder 2 and the outer diameter at the head portion 4A of the plug head 4 are arranged to be circular as viewed in a direction of the central axis CL. However, as shown in FIGS. 6A to 6C, the sectional shapes of the inside diameter at the seat portion 2A of the plug holder 2 and the outer diameter at the head portion 4A of the plug head 4 may be formed in a polygonal shape as viewed in the direction of the central axis CL. FIG. 6A shows a triangle shape; FIG. 6B shows a square shape; and FIG. 6C shows a hexagonal shape. In each of the examples, the slit portion 5 is formed in a direction of respective apexes of the plug head 4 from the central axis CL. Considering the process of forming the vent hole H, the sectional shape of the outer diameter of the plug holder 2 as viewed in the direction of the central axis CL is preferably formed in a circular shape, but is not particularly limited thereto. In the present invention, if the slit portion 5 is closed when the plug head 4 is pushed toward the mold rear side, the slit portion 5 may be formed without going through the central axis CL.

What is claimed is:

1. A vent plug for a tire vulcanization mold mounted in a vent hole of the tire vulcanization mold, the vent plug comprising: a plug holder having a hollow ventilation portion; and a plug head fitted within the ventilation portion, wherein the plug holder includes a tapered seat portion, an inside diameter of which becomes smaller toward a mold rear side, and a cylinder portion located at the mold rear side of the seat portion, the plug head includes a tapered head portion, an outer diameter of which becomes smaller toward the mold rear side, a base body portion located at the mold rear side of the head portion, and a slit portion communicated with the ventilation portion from an upper end face of the plug head, wherein the slit portion in the plug head is constructed and designed so that the slit portion provides elastic forces which resist the closing of the vent, until, when the vent plug is in use, a tire being vulcanized presses on and closes the vent, and the elastic forces reopen the vent after the tire is removed, and when defining an inside diameter at an upper end face of the plug holder as D1, and an outer diameter at an upper end face of the plug head when the slit portion is opened as D2, D1<D2 is satisfied, and when defining a taper angle of the seat portion as $\alpha 1$, and a taper angle of the head portion as $\alpha 2$, $\alpha 1 < \alpha 2$ is satisfied.

2. The vent plug for the tire vulcanization mold according to claim 1, wherein the seat portion has a conical seat surface, the head portion has a frustum shape, and the slit portion is formed in a radial direction from a central axis of the head portion and the base body portion.

3. The vent plug for the tire vulcanization mold according to claim 1, wherein when defining a linear expansion coefficient of a material constituting the plug holder as K1, and defining a linear expansion coefficient of a material constituting the plug head as K2, K1<K2 is satisfied.

4. A tire vulcanization mold having a vent hole, wherein the vent hole is formed with a vent plug for the tire vulcanization mold comprising a plug holder having a hollow ventilation portion and a plug head fitted within the ventilation portion, the plug holder includes a tapered seat portion, an inside diameter of which becomes smaller toward a mold rear side, and a cylinder portion located at the mold rear side of the seat portion, the plug head includes a tapered head portion, an outer diameter of which becomes smaller toward the mold rear side, a base body portion located at the mold rear side of the head portion, and a slit portion communicated with the ventilation portion from an upper end face of the plug head;

wherein the slit portion in the plug head is constructed and designed so that the slit portion provides elastic forces which resist the closing of the vent, until, when the vent plug is in use, a tire being vulcanized presses on and closes the vent, and the elastic forces reopen the vent after the tire is removed, and when defining an inside diameter at an upper end face of the plug holder as D1, and an outer diameter at an upper end face of the plug head when the slit portion is opened as D2, D1<D2 is satisfied, and when defining a taper angle of the seat portion as $\alpha 1$, and a taper angle of the head portion as $\alpha 2$, $\alpha 1 < \alpha 2$ is satisfied.

5. A method for manufacturing a pneumatic tire comprising a step of carrying out a vulcanization process by using the tire vulcanization mold according to claim 4.

* * * * *

UNITED STATES PATENT AND TRADEMARK OFFICE
CERTIFICATE OF CORRECTION

PATENT NO. : 7,850,439 B2
APPLICATION NO. : 12/397398
DATED : December 14, 2010
INVENTOR(S) : Hiroyuki Furutani It is certified that error appears in the above-identified patent and that said Letters Patent is hereby corrected as shown below:

(Column 8, line 51) In Claim 1, delete "a1," and insert -- α1, --, therefor.

Signed and Sealed this
Fifth Day of April, 2011

David J. Kappos
*Director of the United States Patent and Trademark Office*